Patented June 18, 1929.

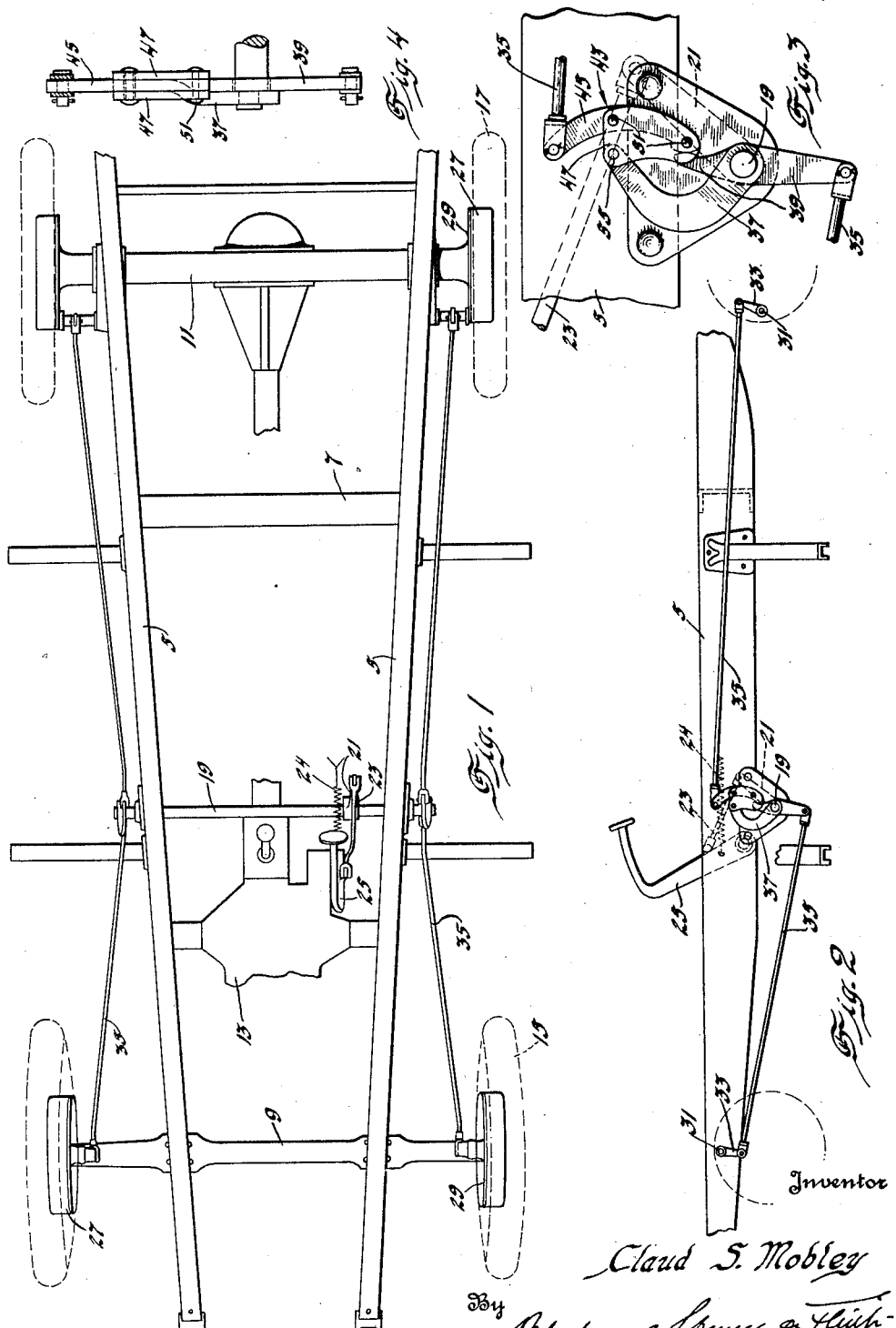

1,717,616

UNITED STATES PATENT OFFICE.

CLAUD S. MOBLEY, OF DETROIT, MICHIGAN, ASSIGNOR TO GENERAL MOTORS CORPORATION, OF DETROIT, MICHIGAN, A CORPORATION OF DELAWARE.

BRAKE EQUALIZER.

Application filed January 5, 1928. Serial No. 244,631.

This invention relates to brake operating mechanism and is intended for use on vehicles particularly in connection with brakes both on the front and rear wheels.

An object of the invention is to provide a comparatively simple operating mechanism between the pedal or other manually operated lever and the brakes involving mechanism to effect a balanced relation between the brakes of the front and rear wheels of each side of the vehicle.

Other objects and advantages will be understood from a reading of the following specification and an examination of the accompanying drawing.

In the drawing:

Figure 1 is a plan view of the vehicle chassis with my novel brake mechanism associated therewith.

Figure 2 is a side elevation.

Figure 3 shows the balancing mechanism on an enlarged scale and in side elevation.

Figure 4 illustrates the same in end elevation.

Referring by reference characters to the drawing, numeral 5 represents the side members of a conventional chassis frame. Numeral 7 illustrates one of the cross members thereof. Numerals 9 and 11 represent the front and rear axles respectively. A part of the motor is shown at 13, and 15 and 17 are the front and rear wheels respectively.

Suitably journalled in the frame at a point midway between the front and rear ends of the vehicle is a rock shaft 19. This rock shaft has an upstanding arm 21 between its ends, the drawing showing the rock shaft substantially in the longitudinal plane of the pedal 25. Between the pedal 25 and the rock shaft arm 21 is a connecting link 23 by means of which depression of the pedal causes a counter-clockwise rotation of shaft 19. After the depression of the pedal is relieved a spring 24, which may be connected to any convenient point on the frame and to the pedal, restores the rock shaft to its former position, giving it a clockwise rotary movement.

Associated with each wheel 15 and 17 is a brake drum 27, and a fixed backing plate 29 is associated with the brake drum to house the brake actuating members which engage the inner periphery of the drum. The member 29 is carried by the rear axle housing in case of the rear axle and by the steering knuckle for the front wheel brakes. Any suitable actuating means as a cam, for example, may be used within the housing defined by the drum and the backing plate. This cam is not illustrated as neither it nor the actuating brake mechanism within the drum constitutes any part of the invention. This brake actuating means is shown in the drawing as carried by shaft 31 projecting through the backing plate where it is provided with an actuating arm 33. This structure is common to both the front and rear wheels. Extending rearwardly from the front wheel brake and forwardly from the rear wheel brake are connecting links 35. On each end of rock shaft 19 outside the frame members 5 are rigidly secured arms 37 which, as shown in the drawing, extend upwardly and are bowed forwardly. Rotatable on shaft 19 adjacent each arm 37 is a lever 39. This lever projects downwardly and at its lower end is connected to the connecting link 35 which extends from the front brake rearwardly. The upper end of each rigid arm 37 is deflected from the plane of its shaft attaching portion into the plane of lever 39. This is illustrated perhaps best in Figure 4. To the upper end of arm 37 is pivoted a lever 43. Lever 43 at its upper end is connected by link 35 with arm 33 extending from the cam shaft 31 of the rear wheel brake. The lower end of lever 43 and the upper end of lever 39 are positioned in contact with each other for the purpose of communicating motion, the one to the other, to effect an equalized braking action between the brakes at the front and at the rear of the vehicle in a manner which is well known and which will be well understood.

It is proposed to construct lever 43 as follows. Two plates 47 are spaced on either side of an arm 45 secured between the plates by suitable fastening means 51. This construction is shown in Figures 3 and 4. A pivot pin 55 is used to pivotally mount the two plates 47 on the rigid arm 37, the plates 47 lying on opposite sides of the deflected portion of the fixed arm 37 and engaging the ends of the pivot pin 55 which project from the plane of the arm 37. By this means a very well reinforced pivotal connection is made for the upper pivotal connection between lever 43 and arm 37. Sufficient rigidity is afforded to the projecting arm 45 and the lower end of 45 constitutes the point of connection with lever 39, this point of connection lying between the two plates 47 with the result that the coplanar relation between lever 39 and arm 45, constituting a part of lever 43, is assured. It will be observed that the construction of this upper lever member 43 is quite an important feature of the invention in that it is so related to the pivotal arm as to swing in a fixed plane and it, by its construction, ensures the coplanar relation between the lever 39 and the lever 43, which relation is necessary for producing equalization between the front and rear brakes. Furthermore, this construction is extremely simple and economical to manufacture.

The brake is applied by depression of pedal 25 which rocks shaft 19 with its arms 37. The rock shaft rotating in a clockwise direction pulls upon links 35 and applies both brakes, front and rear. Should one brake offer more resistance than the other, as in the case of somewhat worn brake linings, equalization is effected by means of pressure being exerted between the adjacent ends of levers 43 and 39.

I claim:

1. Brake mechanism comprising a rock shaft, means to rock said rock shaft, terminal arms on said rock shaft, a lever rotatably supported on each of said arms, a second lever mounted on said rock shaft adjacent each of said arms, means connecting each of said levers to a brake, the ends of said levers, remote from their points of connection with said connecting means being in contact whereby to produce a balanced action between the brakes, each of said terminal arms being distorted from the plane of its shaft attaching portion into the plane of the second lever, said first lever including members engaging opposite faces of said terminal arms adjacent the pivot, said first lever also including an arm fixed to and between said members, said last named arm being connected at one end to one of the brake connecting means and at its other end engaging the second lever between the said members constituting a part of the first lever.

2. Brake operating mechanism for vehicles, comprising a rock shaft, terminal arms secured thereto, first levers rotatably mounted on each of the arms, second levers rotatably mounted on said shaft one adjacent each arm, the first and second levers at each end of said shaft lying in a common plane, adjacent ends of said levers being in contact, opposite ends being connected to brakes, and means associated with one of said levers to maintain a coplanar relation between said levers.

3. Brake mechanism comprising a rock shaft, means to rock said rock shaft terminal arms on said rock shaft, a lever rotatably supported on each of said arms, a second lever mounted on said rock shaft adjacent each of said arms, means connecting each of said levers to the brake, the ends of said levers remote from their points of connection with the brake connecting means being in contact whereby to produce a balanced action between the brakes, each of said terminal arms being distorted from the plane of its shaft-attaching portion into the plane of the second lever, said first lever including members engaging opposite faces of said terminal arms adjacent the pivot between said arms and members.

In testimony whereof I affix my signature.

CLAUD S. MOBLEY.